US007031717B2

(12) United States Patent
Mazzara

(10) Patent No.: US 7,031,717 B2
(45) Date of Patent: Apr. 18, 2006

(54) METHOD OF PROVIDING A WIRELESS SERVICE CONNECTION FOR A MOBILE VEHICLE

(75) Inventor: William E. Mazzara, Drayton Plains, MI (US)

(73) Assignee: General Motors Corporation, Detroit, MI (US)

( * ) Notice: Subject to any disclaimer, the term of this patent is extended or adjusted under 35 U.S.C. 154(b) by 562 days.

(21) Appl. No.: 10/000,268

(22) Filed: Nov. 2, 2001

(65) Prior Publication Data

US 2003/0087642 A1 May 8, 2003

(51) Int. Cl.
*H04Q 7/20* (2006.01)

(52) U.S. Cl. ................ 455/450; 455/432.3; 455/422.1; 455/435.2; 455/443; 455/552.1; 455/448; 455/452.2; 455/435.3; 455/453; 455/456.2; 455/411; 455/451; 455/452.1

(58) Field of Classification Search ................ 455/450, 455/443, 552.1, 435.2, 448, 432.3, 422.1, 455/452.2, 453, 435.3, 456.2, 411, 451, 452.1
See application file for complete search history.

(56) References Cited

U.S. PATENT DOCUMENTS

| | | | | |
|---|---|---|---|---|
| 5,983,097 | A * | 11/1999 | Kakinuma et al. | 455/422.1 |
| 5,999,811 | A * | 12/1999 | Molne | 455/432.3 |
| 6,377,804 | B1 * | 4/2002 | Lintulampi | 455/435.2 |

* cited by examiner

*Primary Examiner*—Joseph Feild
*Assistant Examiner*—David Nguyen
(74) *Attorney, Agent, or Firm*—Cardinal Law Group

(57) ABSTRACT

The invention provides a method of providing a wireless service connection for a mobile vehicle. A portion of a system access list is prioritized, based on a channel identifier in a first band. A failed connection notification may be received on a primary channel of the prioritized system access list. A secondary channel of the prioritized system access list is selected in response to the failed connection notification on the primary channel.

17 Claims, 3 Drawing Sheets

300

METHOD OF PROVIDING A WIRELESS SERVICE CONNECTION FOR A MOBILE VEHICLE

FIELD OF THE INVENTION

This invention generally relates to a method of providing a wireless service connection for a mobile vehicle. In particular, the invention relates to a method of providing a connection to a wireless cellular network based on a system access list.

BACKGROUND OF THE INVENTION

Information and interactive services available to mobile vehicles are increasing due to the demand of mobile vehicle operators for services such as navigation assistance, directory assistance, vehicle maintenance assistance, roadside assistance, information services assistance and emergency assistance. Requests for many of these services occur when a vehicle is outside of a home region, for example, during personal travel or business trips to neighboring or distant cities. In addition, the number of vehicles outfitted with suitable equipment to request and receive service information is growing.

Transmission of data and voice information to and from a mobile vehicle requires at least a portion of the communication system to be a wireless link. This link may be shared with many other mobile vehicles as well as many cellular phone users not in mobile vehicles. With the proliferation of mobile phones for personal use and for mobile vehicle assistance, a preferred cellular service carrier may be unable to meet the needs of all the clients and subscribers. Requests for mobile phone connections may be detrimentally impacted due to the unavailability of transmission channels during times of high usage, or limited service access in certain markets. Call requests may be deferred to non-preferred carriers, or may be denied altogether. Consequently, there may be times when service with a preferred carrier is not available, or service may not be available at all.

Service requests from mobile vehicles may occur often while roaming outside of local calling areas. Mobile phones may not receive adequate priority for cellular service access when outside the home service area. One or more wireless carriers may be capable of providing wireless connections to the mobile vehicle while roaming, however, the carriers may not have a contract for providing service to the mobile vehicle in that geographical area. If there are no contract wireless service providers in an area, then a wireless connection may be unobtainable or require a premium payment.

Mobile vehicles may reside in and cross multiple market areas, with access requests possible in each market area. As a vehicle traverses through one cellular region to another, multiple carriers may be utilized. A mobile vehicle may not have service contracts in place with each carrier, and excessive charges may be applied when accessing non-preferred carriers.

Provisions for continued services to roamers may require an allocation of voice channels that a carrier in a particular geographical area may prefer to reserve for subscribers in the home region. As a result, a mobile vehicle may not get a connection with a carrier due to the unavailability of channels. A carrier in a particular market may allocate channels for use by other preferred roamers in the area, possibly preventing an unaffiliated mobile vehicle from receiving services within the particular market.

In cases where a cellular phone user is unable to obtain a wireless connection with a primary contract carrier, the user may be given a message that no service is available and left to his/her own means to procure services with another carrier. A mobile vehicle may benefit from having a means for automatically locating services with a secondary carrier within the same band and using the same acquisition technology as the primary carrier. The secondary carrier could be, for example, in an analog cellular band such as 800 MHZ cellular rather than a PCS band nominally at 900 MHz or 1900 MHz. The secondary carrier also may be employing a different technology such as TDMA, for example, rather than CDMA or vice versa. When the secondary carrier is not within the same band, it would be desirable to methodically switch and search for a secondary carrier outside of the primary band. When outside of the home market region, it also would be desirable to employ a secondary carrier that is a preferred contract carrier and avoid unnecessary premium charges. It would also be desirable to automatically determine a preferred primary or secondary contract carrier based on the geographical region where the mobile vehicle is currently located. Cell phone functions such as registration and call origination may then be done with a preferred contract carrier.

In situations where a mobile vehicle urgently requires a cellular phone connection, a fallback position may be desirable. A fallback position might include the use of a selected phone number that receives high priority service by multiple carriers. Another fallback position might include the use of the well-established analog mobile phone system in conjunction with a widely recognized phone number for high priority service.

It is the object of this invention, therefore, to provide a method for establishing a wireless service connection for a mobile vehicle to a cellular network, using preferred carriers and procedures depending on the geographical region in which the mobile vehicle is located, and overcoming the deficiencies and obstacles described above.

SUMMARY OF THE INVENTION

One aspect of the invention provides a method of providing a wireless service connection for a mobile vehicle. A portion of a system access list may be prioritized, based on a channel identifier in a first band. A failed connection notification may be received on a primary channel of the prioritized portion of the system access list. A secondary channel of the system access list portion may be selected in response to the failed connection notification on the primary channel. The secondary channel may correspond to a secondary contract carrier. The secondary channel may be in a second band. The secondary channel may be a non-preferred channel.

The prioritized portion of the system access list may correspond to a geographical area in proximity to the channel identifier in the first band. The system access list may be comprised of a plurality of records corresponding to a plurality of wireless carriers.

A mobile phone may register with a contract carrier on a primary channel in the first band, or the mobile phone may register with a contract carrier on a secondary channel in response to a failed connection notification on the primary channel. A call may be originated from a mobile phone with a contract carrier on a primary channel in the first band, or the call may be originated with a contract carrier on a secondary channel in response to the failed connection notification on the primary channel.

A contract carrier may be accessed using a cleared connection number in response to a failed connection notification on the secondary channel. The mobile phone may be switched to an analog band in response to a failed connection notification on the secondary channel, and a channel may be accessed in the analog band using a cleared connection number.

Another aspect of the current invention is a computer usable medium, including a program for providing a wireless service connection for a mobile phone.

The program may include computer program code for prioritizing a portion of a system access list based on a channel identifier in a first band, code for receiving a failed connection notification on a primary channel of the prioritized system access list portion, and code for selecting a secondary channel of the prioritized system access list portion in response to a failed connection notification on the primary channel.

The program may further include computer program code for registering a mobile phone with a contract carrier. The program may further include computer program code for originating a call request with a contract carrier.

The program may further include computer program code for accessing a contract carrier using a cleared connection number in response to a failed connection notification on the secondary channel. The program may further include computer code for switching to an analog band in response to a failed connection notification on the secondary channel, and computer program code for accessing a channel in the analog band using a cleared connection number.

Another aspect of the current invention is a wireless service connection system for providing a wireless service connection for a mobile phone.

The wireless service connection system may provide a means for prioritizing a portion of a system access list based on a channel identifier in a first band. The wireless service connection system may also provide a means for receiving a failed connection notification on a primary channel of the prioritized system access list, and a means for selecting a secondary channel of the prioritized system access list in response to a failed connection notification on the primary channel.

The wireless service connection system may also provide a means for registering a mobile phone with a contract carrier on a primary channel in the first band, or a means for registering the phone with a contract carrier on a secondary channel in response to a failed connection notification on the primary channel. The wireless service connection system may also provide a means for originating a call request with a contract carrier on a primary channel in the first band, or with a contract carrier on a secondary channel in response to the failed connection notification on the primary channel.

The wireless service connection system may also provide a means for accessing a contract carrier using a cleared connection number in response to a failed connection notification on the secondary channel. The wireless service connection system may also provide a means for switching to an analog band in response to a failed connection notification on the secondary channel, and a means for accessing a channel in the analog band using a cleared connection number.

The aforementioned, and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENTS

Figure 1:
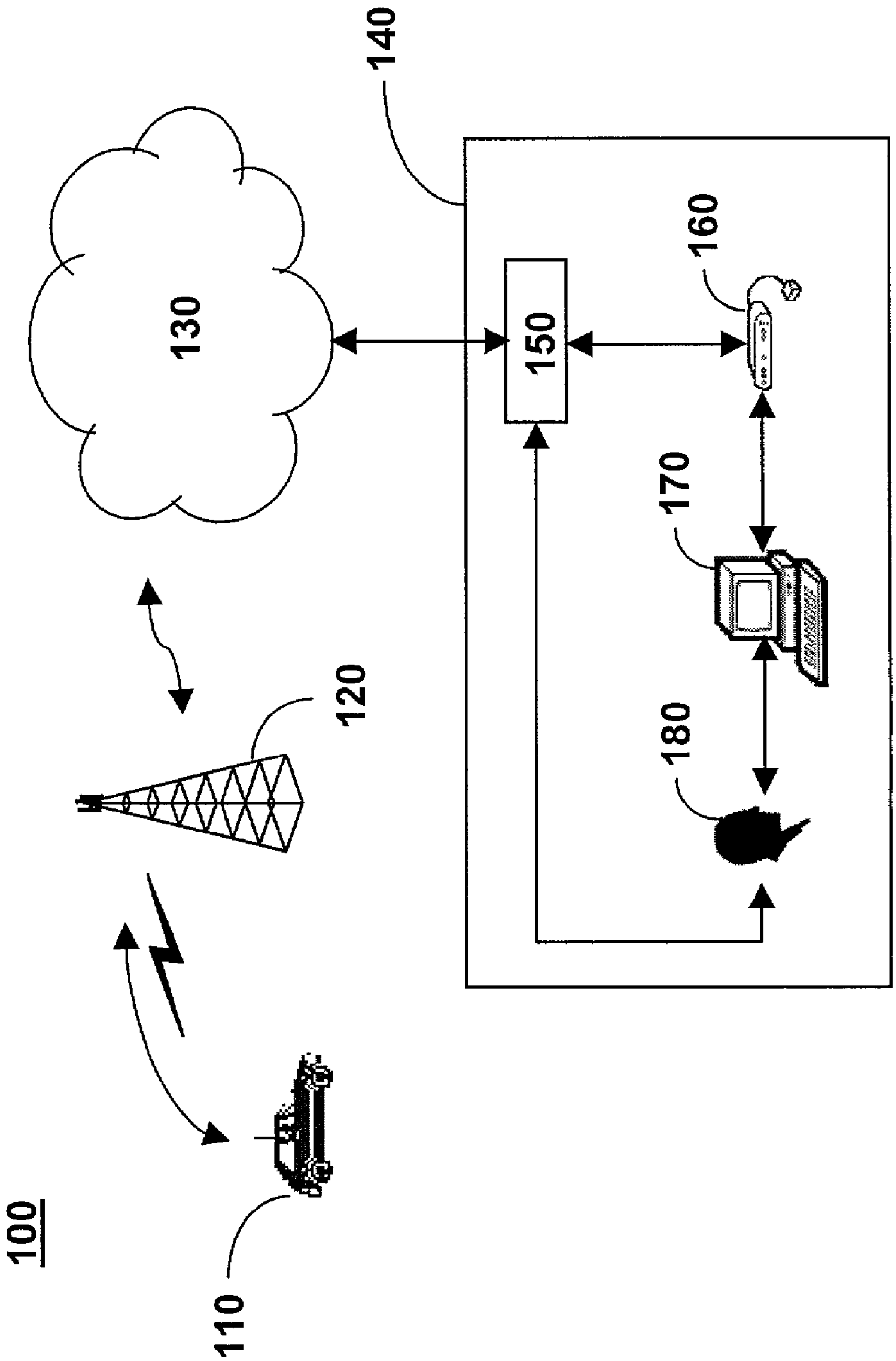
FIG. 1 is a schematic diagram of one embodiment of a system for providing a wireless service connection for a mobile vehicle, in accordance with the current invention.

FIG. 1 shows one embodiment of a system for providing a wireless service connection to a mobile vehicle, in accordance with the present invention at 100.

Wireless connection system 100 may include one or more mobile vehicle clients 110; one or more carrier systems 120; one or more communication networks 130; and one or more communication nodes 140. A communication node may contain one or more data and voice switches 150; one or more communication node modems 160; one or more service applications 170; and one or more service advisors 180.

Mobile vehicle client 110 may be a mobile vehicle equipped with suitable hardware and software for transmitting and receiving voice and data communications. Mobile vehicle client 110 may contain a cellular or mobile phone for sending or receiving voice or data communications. The cellular phone may be, for example, an analog phone or a digital phone. An analog phone may operate, for example, on an analog or an analog cellular band. A digital phone may operate, for example, on a PCS (personal communication services) or digital cellular band. The cellular phone may be a dual band phone or a dual mode phone. A dual band phone may operate on more than one band, for example, on a band of frequencies nominally at 800 MHz or on a band of frequencies nominally at 900 MHz or 1900 MHz. A dual mode phone may operate in more than one mode, for example, on a digital PCS band using TDMA (time division multiple access) or CDMA (code division multiple access). A dual mode phone may also operate as an analog phone as well as a digital phone. The cellular phone may be a combination dual-mode and dual-band phone. The cellular phone may reside in a hardware cluster located in the mobile vehicle.

Mobile vehicle client 110 may also be an occupant or driver of a mobile vehicle who carries suitable hardware and software for transmitting and receiving voice and data communications. Mobile vehicle client 110 sends radio transmissions to and receives radio transmissions from carrier system 120.

Carrier system 120 is a wireless communications carrier. Carrier system 120 may be, for example, a mobile telephone system. The mobile telephone system may be an analog mobile telephone system operating over a prescribed band nominally at 800 MHz. The mobile telephone system may be a digital mobile telephone system operating over a prescribed band nominally at 900 MHz, 1900 MHz, or any suitable band capable of carrying mobile communications. Carrier system 120 may transmit and receive signals from mobile vehicle client 110. Carrier system 120 may be connected to a communication network 130.

Communication network 130 may comprise a mobile telephone switching office, a public switched telephone network, another wireless network, a fiber network, a wired network, an optical network, or any combination thereof. Communication network 130 connects carrier 120 to a communication node 140.

Communication node 140 may contain a data and voice switch 150. Switch 150 may be connected to communication network 130. Switch 150 may transmit voice or data transmissions from communication node 140. Switch 150 may also receive voice or data transmissions from mobile vehicle 110 through carrier system 120 and communication network 130. Switch 150 may receive data transmissions from or send data transmissions to communication node modem 160, or receive voice transmissions from or send voice transmissions to service advisor 180.

Communication node 140 may contain one or more communication node modems 160. Communication node modem 160 may send data to or receive data from switch 150. Modem 160 may transfer data to or from service application 170.

Communication node 140 may contain one or more service applications 170. Service application 170 may be any suitable hardware and software capable of providing requested services from mobile vehicle client 110. Service application 170 may provide one or more of a variety of services, including navigation assistance, directory assistance, emergency assistance, roadside assistance, business or residential assistance, information services assistance, and emergency assistance. Service application 170 may communicate with mobile vehicle client 110 through carrier 120, communication network 130, and communication node switch 150 using data transmissions through communication node modem 160. Service application 170 may provide requested information to service advisor 180.

Service advisor 180 may be a real advisor or a virtual advisor. A real advisor may be a human being in verbal communication with mobile vehicle client 110. A virtual advisor may be a synthesized voice interface responding to requests from mobile vehicle client 110. Service advisor 180 may provide services to mobile vehicle client 110. Services provided by service advisor 180 may include navigation assistance, directory assistance, roadside assistance, business or residential assistance, information services assistance, and emergency assistance. Service advisor 180 may communicate with mobile vehicle client 110 through carrier 120 and communication network 130 using voice transmissions, or through service application 170 and communication node modem 160 using data transmissions. Switch 150 may select between voice transmissions and data transmissions. Connection between mobile vehicle client 110 and, for example, a communication node, using communication network 130 and wireless carrier 120, may occur through steps including registration and call origination with carrier 120. A preferred carrier may be selected using system identification information broadcasted by a local carrier to aid in the selection of a preferred carrier in the same geographical region as the mobile vehicle.

Figure 2:
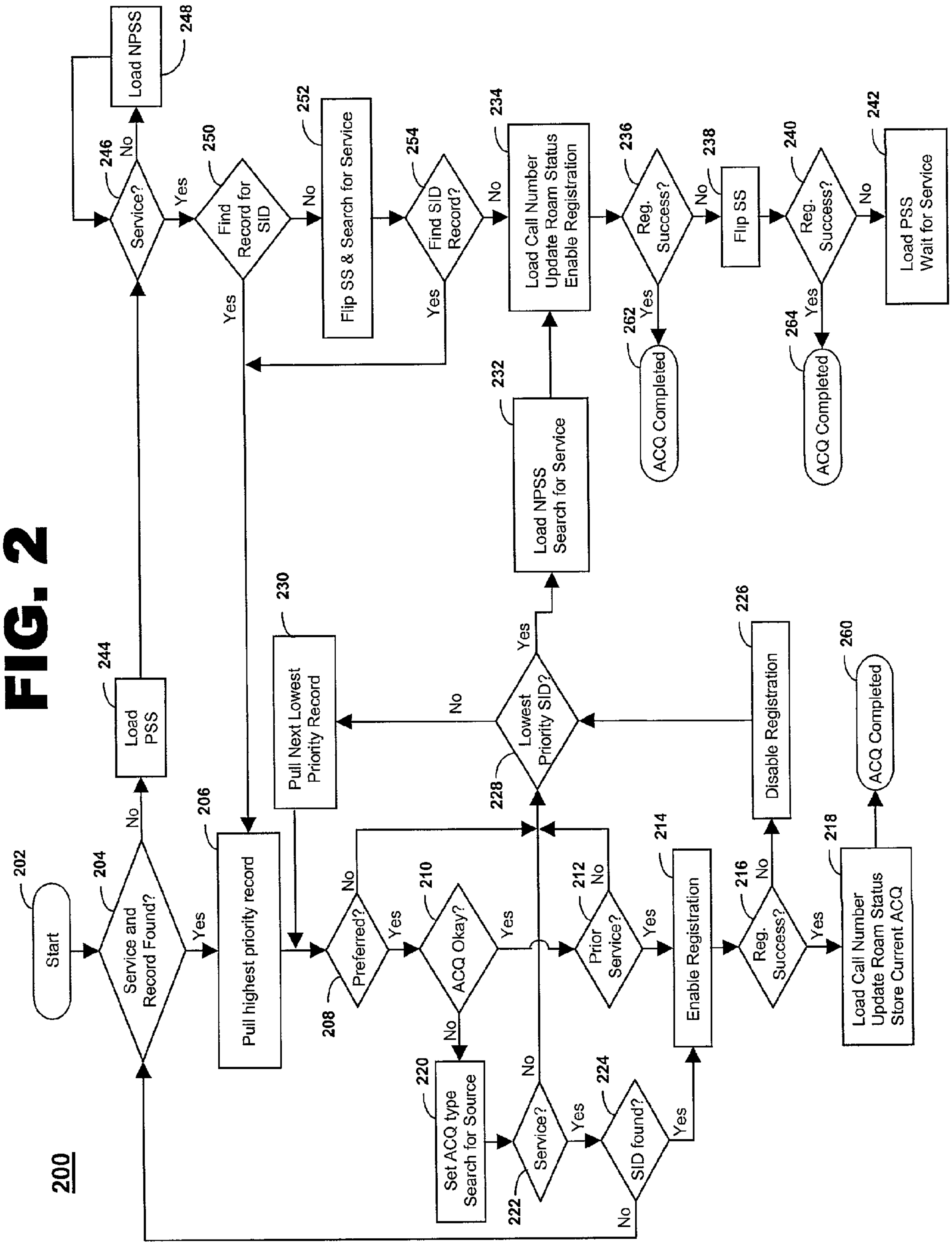
FIG. 2 is a flow diagram of one embodiment of a method for providing a wireless service connection to a mobile vehicle, in accordance with the current invention.

FIG. 2 shows a flow diagram of one embodiment of a method for providing a wireless service connection to a mobile vehicle, in accordance with the present invention at 200.

Wireless service connection method 200 may comprise a number of steps, some of which may be described in detail in the Electronic Industry Association (EIA) Interim Specification IS-95 and Interim Specification IS-683. Other steps embody the present invention. The method invokes a system identifier (SID) table or a system access list. The system identifier table or system access list may contain a table or list of carriers. Each carrier may have an associated priority. An attempt to obtain a service connection with each carrier listed in the system access list may be made in accordance with the indicated priority. If all preferred carriers are unavailable, non-preferred carriers may be tried. If all listed carriers in the system access list are unavailable, then another method may be attempted to obtain connectivity using cleared call connection numbers.

As seen at block 202, an acquisition task may be started. At the start of the acquisition task, steps to acquire a preferred wireless carrier on a digital cellular band or an analog cellular band may be initiated. During the start of the acquisition task, as seen at block 202, registration may be disabled, and a current acquisition type may be replaced with a preferred acquisition type prior to looking for service on a digital cellular band. The digital cellular band may be, for example, a set of prescribed frequencies nominally at 900 MHz, or a set of prescribed frequencies nominally at 1900 MHz. An analog cellular band may be, for example, a set of prescribed frequencies nominally at 800 MHz. The preferred acquisition type may be, for example, code division multiple access, time division multiple access or frequency division multiple access. The current acquisition type may be replaced with a preferred acquisition type, for example, when a change has been detected in the current system identifier. The acquisition type may be replaced with a preferred acquisition type, for example, if a system timeout has occurred. Registration may include establishing the identity of the mobile phone with a carrier in a cell region. Disabling registration may involve a temporary postponement of the registration sequence.

The acquisition task may be initiated upon power up of a cellular or mobile phone, at the termination of a call, upon change of a system identifier, or at the expiration of an operation timer if the system is operating on a nominally 800 MHz cellular network. Power up may occur, for example, when mobile vehicle client 110 desires to initiate a call request, or when the vehicle containing mobile vehicle client 110 is turned on. The termination of a call may occur, for example, when mobile vehicle client 110 no longer wishes to maintain a connection, or when data and voice communication sessions with mobile vehicle client 110 have ended, or when a handoff from one carrier in a cellular market to another carrier in a different cellular market occurs. The system identifier may change, for example, when mobile vehicle client 110 roams from one cellular market to another, or when conditions such as environmental conditions prevail that interrupt service with the currently connected carrier. An internal timer on a mobile phone, for example, may expire if service from a carrier is not received within a preset time.

As seen at block 204, cellular service may or may not be found based upon the initial request. Service may be found and a record of the current system identifier located. Service may be found if the mobile phone has located an available carrier and is able to register. If service is found, a current system identifier may be transmitted from the carrier to mobile vehicle client 110. The record of the current system identifier may be located if information regarding the current system is found in a system access list. The system access list may be, for example, a preferred roaming list. The system access list may be part of a preferred roaming list. The system access list may be part of a system identifier table. The system access list may be located in the cellular phone. The system access list may be located within mobile vehicle client 110. Records in the system access list may correspond to one or many wireless carriers. Records in the system access list may contain geographical information of wireless carriers. Records of wireless carriers may contain geographical information associated with the current system identifier. Records of wireless carriers may be selected based on geographical proximity to the current system identifier.

If service is found and the current system identifier is located in the system access list or system identifier table, then a record, for example, with the highest priority may be extracted for a geographical region where the current system identifier was found, as seen at block 206. The geographical region may be a cellular market. The geographical region may be, for example, a metropolitan region. A geographical region may be, for example, a county or a group of adjacent counties. A geographical region may include portions of neighboring states.

The record of highest priority for the system identifier may be extracted from the system access list. Priority may be based on one or more condition factors. A condition factor may be, for example, an established contract or service agreement with one or more carriers. A condition factor may be based, for example, on affiliated carriers. A condition factor may be based, for example, on a current system identifier. A condition factor may be based, for example, on a previous system identifier. A condition factor may be based, for example, on a current acquisition type or a previous acquisition type. Priority may be indicated by a field in the system access list or system identification table. Priority may be indicated by the position of a carrier in a preferred roaming list. Priority may be indicated by position of a carrier in the system access list. Prioritization of the system access list may be based, for example, on a channel identifier corresponding to the current system identifier received by the mobile phone in a particular geographical or market region. A portion of the system access list may be prioritized. A portion of the system access list may be prioritized based on the channel identifier. A portion of the system access list may be prioritized based on geographical proximity to the channel identifier.

Prioritization of the system access list may occur, for example, when a vehicle is initially purchased. Prioritization of the system access list may occur, for example, when a call is placed to a call center. Prioritization of the system access list may occur, for example, when the current system identifier changes, as when a mobile vehicle traverses a cellular market. Prioritization of the system access list may occur, for example, when a call has been originated or a phone has been registered. Prioritization of the system access list may occur, for example, when a call has been placed with a non-preferred carrier.

The record may contain a field indicating if a particular carrier is preferred as seen at block 208. If the record for the current system identifier is preferred and if the search for the record was performed using the acquisition type of the record as seen at block 210, and if service with the current carrier has occurred previously as seen at block 212, then registration may be enabled as seen at block 214. A mobile phone may register by sending information regarding its location in a message to the network of the current carrier. The network may then know in which cell region the mobile phone is currently located for further transmissions. Service with the current carrier may have occurred if call service has been previously established between the current carrier and mobile phone client 110. The acquisition type of the current system identifier may be stored in another field within the system access list or system identification table. The preference or lack of preference for a particular carrier may be stored in yet another field within the system access list or system identification table. A particular carrier may be preferred, for example, if the carrier is the home service carrier, or a partner or affiliate of the home service carrier for mobile vehicle client 110.

As indicated at block 216, if registration with the current carrier is successful, then a personal number or a connection number for a call center service may be loaded. The roaming status may be updated, and the acquisition type of the current carrier may be stored as seen at block 218. The acquisition type of the current carrier may be stored in the system access list. The roaming status may be stored in the system access list, indicating whether mobile vehicle client 110 is physically located outside the service area of the home service carrier.

A connection number with a call center may be loaded and a call request placed. A call center may be a stationary site with suitable hardware, software and personnel for responding to requests from mobile vehicle client 110. The connection number with a call center may be, for example, a phone number associated with a call center. The connection number with a call center may be, for example, a phone number recognized by the preferred carrier and by the call center as an emergency services request number. Services offered by the call center may include, for example, navigation and directory assistance information, vehicle service requests, data and voice transmissions, and emergency roadside assistance services. The acquisition task may be completed, as seen at block 260.

As seen at block 210, in cases where the record of highest priority extracted from the system access list or system identification table indicates that the acquisition type of the record does not correspond with the acquisition type used for the search, then the acquisition type may be set to that contained in the record as seen at block 220. Services may be requested on the corresponding digital cellular band by using the updated acquisition type as seen at block 220.

If services using the updated acquisition type are found, as indicated in block 222, then a check may be made to verify that the system identifier is located in the system access list as seen at block 224. Registration may then be enabled, as indicated at block 214.

If service has not been received as indicated at block 222, then a check may be made whether the record of the current system identifier has the lowest priority, as seen at block 228. A current system identifier may have the lowest priority, for example, if services in a particular geographical region have been sought from all other carriers except one. A current system identifier may have the lowest priority, for example, if all possible carriers in a particular region have received requests for service according to a prescribed order.

If the system identifier is not found in the system access list, as indicated at block 224, then a check for service and system identifier record may be made as seen at block 204. If registration has been enabled as seen at block 214, and registration with the current carrier has been unsuccessful as seen at block 216, then further attempts to register may be discontinued as seen at block 226, and a check is made to determine whether the record of the current system identifier is the lowest priority, as seen at block 228.

If the current record for the geographical region is not the lowest priority record as indicated at block 228, then the next lowest priority for the geographical region may be extracted as seen at block 230, and the record checked to determine if a particular carrier is a preferred carrier as seen at block 208.

If the current record for the geographical region is the lowest priority record as indicated at block 228, then additional steps may be executed to establish a call connection in accordance with the current invention. In a conventional cellular system, further call connection attempts may be disbanded at this point, and the phone user notified of failure to connect. A failed connection notification may be given, for example, to the mobile phone on a primary channel of the prioritized system access list. A failed connection notification may be received, for example, when access to a preferred carrier is not available based on the channel identifier or system identifier. A secondary channel may be selected in response to the failed connection notification on the primary channel. A second band may be selected in response to the failed connection notification when, for example, access to a preferred carrier is not available in the first band.

In one embodiment of the current invention, a non-preferred system setting (NPSS) may be loaded when the current record for the geographical region is the lowest priority record, and an attempt to obtain service with the non-preferred system setting may be attempted as seen at block 232. The non-preferred system setting may provide access to cellular services using a secondary channel. A secondary channel may correspond to a secondary contract carrier. A secondary channel may correspond to a preferred carrier. A secondary channel may be a non-preferred channel. The non-preferred channel may correspond to a non-preferred carrier. The secondary channel may be in a second band.

As seen at block 234, a connection number for a call center service may be loaded, the roaming status may be updated, and registration may be enabled. The connection number may be an emergency number. If registration is successful as seen at block 236, the acquisition task may be completed as seen at block 262, and a call origination request may be initiated. If registration is unsuccessful as seen at block 236, the system setting may be set or flipped to the preferred system setting as seen at block 238, and registration attempted once again. As seen at block 240, if registration is successful, then the acquisition task may be completed as seen at block 264, and a call origination requested may be initiated. If the registration is unsuccessful, a preferred system setting may be loaded as indicated at block 242. The call may be re-initiated as seen at block 202, or call connection attempts deferred until a later time as seen at block 242 when, for example, a new system identifier is received.

In cases where an acquisition task has been initiated as seen at block 202 and no cellular service has been found based upon the initial request for cellular service as seen at block 204, a preferred system setting (PSS) may be loaded as seen at block 244. The preferred system setting may contain, for example, preferred carrier settings and preferred band settings. As seen at block 246, if service is not obtained using the preferred system settings, then the non-preferred system setting may be loaded as indicated at block 248. The system setting may now be the non-preferred system setting. The non-preferred system setting may include, for example, settings of non-preferred carriers and settings of non-preferred bands. The non-preferred system setting may be, for example, an analog band. Service may now be obtained, as indicated at block 246. If services have been obtained from a preferred system carrier or a non-preferred system carrier, a record for the system identifier is sought as seen at block 250.

As seen at block 250, if a record for the system identifier is found, the record with the highest priority may be extracted for the geographical region where the current system identifier was found, as seen at block 206. As seen at block 250, if a record for the system identifier has not been found, the preferred system or non-preferred system settings may be flipped or loaded as seen at block 252, and a request for services may be made. A check for a record of the current carrier based on the system identifier may then be made, as seen at block 254. If a record of the system identifier is found, the record with the highest priority may be extracted for the geographical region where the current system identifier was found, as seen at block 206. As indicated at block 254, if a record of the current system identifier is not found, a connection number for a call center service may be loaded, the roaming status may be updated, and registration may be enabled as seen at block 234. In cases where the system access list is invoked and the acquisition task is unsuccessfully completed, an additional method may be used as represented in FIG. 3.

Figure 3:
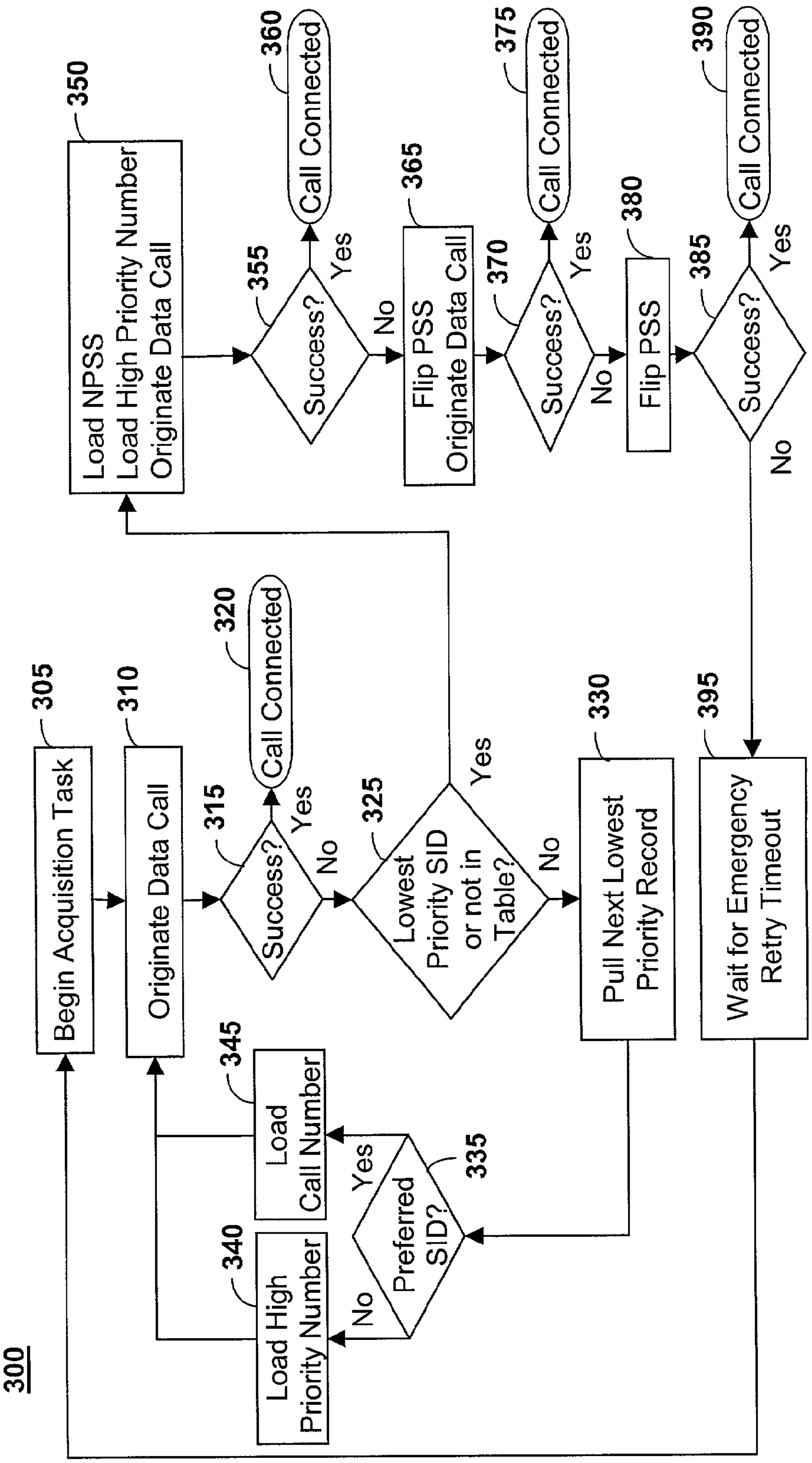
FIG. 3 is a flow diagram of another embodiment of a method for providing a wireless service connection to a mobile vehicle, in accordance with the current invention.

FIG. 3 shows a flow diagram of another embodiment of a method for providing a wireless service connection to a mobile vehicle, in accordance with the present invention at 300.

Wireless service connection method 300 comprises a number of steps for increasing connectivity on cellular networks. Wireless service connection method 300 comprises a retry method. The method may be invoked if a call request from mobile vehicle client 110 fails before a carrier receives an acknowledgment to a vehicle identification message. A vehicle identification message may include, for example, a unique number identified with mobile vehicle client 110. An acknowledgment may be sent, for example, when mobile vehicle client 110 determines the carrier is a preferred carrier. The method may invoke the use of a system identifier table or a system access list. The system identifier table or system access list may contain a list of carriers with an associated priority. Each of the carriers listed in the system access list may be tried in accordance with an indicated priority. If all listed carriers in the system access list are unavailable, then another embodiment may be attempted to obtain connectivity using an analog band. In yet another embodiment, if the listed carriers in the system are unavailable and no carriers are available in an analog band, then a cleared number may be tried on a digital band. A cleared number may be recognized by one or more carriers, allowing a call to be connected without requiring registration. For example, an emergency 911 call may constitute a cleared number. A contract carrier may be accessed using a cleared connection number, in response to a failed connection notification on a secondary channel. A contract carrier may be accessed using a cleared connection number, in response to a failed connection notification on a primary band.

Increased connectivity method 300 may begin with a cellular phone acquisition step as seen at block 305. A cellular phone acquisition step may include, for example, registration and authentication of a mobile phone within a cell region.

Mobile vehicle client 110 may initiate a call as seen at block 310. The call may begin with a data segment, where services from a call center may be requested upon successful connection between mobile vehicle client 110 and a call center.

As seen at block 315, if the data call is successful, then a call connection may be made as seen at block 320. As seen at block 315, if the data call is not successful, then a check may be made using a system access list to determine if the system identifier of the current carrier is in the system access list for the current geographical region as seen at block 325. A check may be made whether the predetermined priority of the current system identifier is the lowest in the table. As seen at block 325, if the system identifier does not have the lowest priority in the system access list, then the record of the next lowest priority carrier may be extracted based on the geographical region of the current carrier and the system access list as seen at block 330.

As seen at block 335, if the system identifier of the next lowest priority carrier as determined at block 330 is not a preferred system identifier, then a connection number for a call center service may be loaded as seen at block 340. As seen at block 335, if the system identifier of the next lowest priority carrier as determined at block 330 is a preferred system identifier, then another connection number for a call center service may be loaded as seen at block 345. A data call may be originated as seen at block 310, whether the system identifier is preferred or not.

As seen at block 325, if the system identifier does have the lowest priority in the system access list, or if the system identifier is not listed in the system access list, then a non-preferred system setting may be loaded, along with a connection number for a call center service and an origination request for a call connection as seen at block 350. The non-preferred system may include, for example, non-preferred carriers on an analog system, or non-preferred carriers on a digital system. The connection number may be, for example, a cleared number or an emergency number.

As seen at block 355, if a data call is successful, then a connection may be made between mobile vehicle client 110 and a call center as seen at block 360. As seen at block 355, if a data call is unsuccessful, the system settings may be flipped to the preferred system settings and another data call attempt may be made as seen at block 365.

As seen at block 370, if a data call that originated with the preferred system settings is successful, then a connection between mobile vehicle client 110 and a call center may be made as seen at block 375. As seen at block 370, if a data call that originated with the preferred system settings is unsuccessful, then the system settings may be flipped once again to a non-preferred system setting as seen at block 380, and a data call originated. The non-preferred system setting may be, for example, an analog cellular band.

A wireless service connection may be attempted by switching to an analog band in response to a failed connection notification on a primary channel, and accessing a channel by using a cleared connection number. A wireless service connection may be attempted by switching to an analog band in response to a failed connection notification on a secondary channel, and accessing an available channel on a first or second band by using a cleared connection number.

As seen at block 385, if a data call that originated with the non-preferred system settings is successful, then a connection between mobile vehicle client 110 and a call center may be made as seen at block 390. As seen at block 385, if a data call originated with the non-preferred system settings is unsuccessful, then the mobile phone may wait for an emergency timer to become exhausted as seen at block 395. When the emergency timer has timed out as seen at block 395, a new attempt to obtain a cellular connection may be attempted as seen at block 305. If the call or call request is terminated, the retry connection method may end.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

The invention claimed is:

1. A method of providing a wireless service connection for a mobile vehicle comprising:

prioritizing a portion of a system access list based on a channel identifier in a first band;

selecting a secondary channel that is not in the system access list portion in response to failed connection notification from channels in the system access list portion, wherein the connection notification comprises a rejection of a call origination and wherein the connection notification comprises a rejection of an attempt to register with a carrier; and accessing a contract carrier using a cleared connection number in response to a failed connection notification on the secondary channel.

2. The method of claim 1 wherein the portion of the system access list corresponds to a geographical area in proximity to the channel identifier.

3. The method of claim 1 wherein the system access list is comprised of a plurality of records corresponding to a plurality of wireless carriers.

4. The method of claim 1 wherein the secondary channel corresponds to a secondary contract carrier.

5. The method of claim 1 wherein the secondary channel is in a second band.

6. The method of claim 1 wherein the secondary channel is a non-preferred channel.

7. The method of claim 1 further comprising:

registering a mobile phone with a contract carrier.

8. The method of claim 1 further comprising:

originating a call request with a contract carrier.

9. The method of claim 1 further comprising:

switching to an analog band in response to a failed connection notification on the secondary channel; and accessing a channel in the analog band using a cleared connection number.

10. A computer usable medium including a program for providing a wireless service connection for a mobile phone comprising:

computer program code for prioritizing a portion of a system access list based on a channel identifier in a first band;

computer program code for receiving a failed connection notification on a primary channel of the system access list portion;

computer program code for selecting a secondary channel of the system access list portion in response to the failed connection notification on the primary channel; and computer program code for accessing a contract carrier using a cleared connection number in response to a failed connection notification on the secondary channel.

11. The computer usable medium of claim 10 further comprising:

computer program code for registering a mobile phone with a contract carrier.

12. The computer usable medium of claim 10 further comprising:

computer program code for originating a call request with a contract carrier.

13. The computer usable medium of claim 10 further comprising:

computer program code for switching to an analog band in response to a failed connection notification on the secondary channel; and computer program code for accessing a channel in the analog band using a cleared connection number.

14. A wireless service connection system for providing a wireless service connection for a mobile phone comprising:

means for prioritizing a portion of a system access list based on a channel identifier in a first band;

means for receiving a failed connection notification on a primary channel of the system access list portion;

means for selecting a secondary channel of the system access list portion in response to the failed connection notification on the primary channel; and means for accessing a contract carrier using a cleared connection number in response to a failed connection notification on the secondary channel.

15. The system of claim 14 further comprising:

means for registering a mobile phone with a contract carrier.

16. The system of claim 14 further comprising:

means for originating a call request with a contract carrier.

17. The system of claim 14 further comprising:

means for switching to an analog band in response to a failed connection notification on the secondary channel; and means for accessing a channel in the analog band using a cleared connection number.

* * * * *